United States Patent
Avadhanam et al.

(10) Patent No.: US 7,519,611 B2
(45) Date of Patent: *Apr. 14, 2009

(54) SYSTEM AND METHOD FOR USING A COMPRESSED TRIE TO ESTIMATE LIKE PREDICATES

(75) Inventors: Srikanth R. Avadhanam, Redmond, WA (US); Nigel R. Ellis, Redmond, WA (US); Campbell Bryce Fraser, Bellevue, WA (US); Rodger N. Kline, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

This patent is subject to a terminal disclaimer.

(21) Appl. No.: 10/926,624

(22) Filed: Aug. 26, 2004

(65) Prior Publication Data

US 2005/0027744 A1    Feb. 3, 2005

Related U.S. Application Data

(63) Continuation of application No. 10/317,640, filed on Dec. 12, 2002, now Pat. No. 6,829,602.

(51) Int. Cl.
*G06F 17/30* (2006.01)

(52) U.S. Cl. ........................................ 707/102; 707/10
(58) Field of Classification Search ............... 707/1–10, 707/100–104.1, 200–206
See application file for complete search history.

(56) References Cited

U.S. PATENT DOCUMENTS

| | | | | |
|---|---|---|---|---|
| 4,864,501 A | 9/1989 | Kucera et al. | ................ | 364/419 |
| 5,111,398 A | 5/1992 | Nunberg et al. | ............. | 364/419 |
| 5,691,917 A | 11/1997 | Harrison | ..................... | 364/514 |
| 5,701,456 A | 12/1997 | Jacopi et al. | ................ | 395/604 |
| 6,829,602 B2 | 12/2004 | Avadhanam et al. | ........... | 707/4 |
| 7,171,427 B2* | 1/2007 | Witkowski et al. | ....... | 707/104.1 |
| 7,308,459 B2* | 12/2007 | Avadhanam et al. | ........ | 707/102 |
| 2004/0003374 A1 | 1/2004 | Van De Vanter et al. | .... | 717/112 |

OTHER PUBLICATIONS

Tryfonofpoulos, Christos et al., Publish/Subscribe with Distributed Hash Tables and Languages from IR, Jan. 28, 2005, www.mpi-sb.mpg.del/2trifon/papers, pp. 1-23.*

S.M. Jafar Rizvi, et al., Comparison of Hash Table Verses Lexical Transducer based Implementations of Urdu Lexicon, 2005, ieeexplore.ieee.org/ie15/10465/33211, pp. 1-6.*

Stephan Schosser et al., An Indexing Scheme for Update Propagtion in Large Mobile Information Systems, Mar. 15, 2004, www.ipd.ira.uka.del/-schosser, pp. 1-12.*

(Continued)

*Primary Examiner*—Diane Mizrahi
(74) *Attorney, Agent, or Firm*—Woodcock Washburn LLP

(57) ABSTRACT

A compressed trie has nodes including multiple character sub-strings. Such multiple character storage reduces the number of nodes in the trie, thereby reducing the amount of memory required for storing the trie and reducing the amount of time required to perform matching. Furthermore, in such a compressed trie, sub-strings are stored in a single character string. Each node references its corresponding sub-string by the sub-string's starting position and length in the character string. Multiple nodes may reference a single sub-string. Thus, referencing rather than storing sub-strings in corresponding nodes eliminates repetitive sub-string storage, thereby reducing the amount of memory required for storing the trie.

19 Claims, 8 Drawing Sheets

OTHER PUBLICATIONS

Tries:Standard Tries, Compressed Tries, Properties of Suffix Ties, http://www.cs.purdue.edu/homes/axa/cs251/transparencies/Ch11-Tries-4×4.pdf, 3 pages.

Al-Suwaiyel, M. et al., "Algorithms for Trie Compaction", *ACM Transactions on Database Systems*, Jun. 1984, 9(2), 243-263.

Comer, D. et al., "The Complexity of Trie Index Construction", *Journal of the Association for Computing Machinery*, Jul. 1977, 24(3), 428-440.

Comer, D., "Heuristics for Trie Index Minimization", *ACM Transactions on Database Systems*, Sep. 1979, 4(3), 383-395.

Comer, D., "Analysis of a Heuristic for Full Trie Minimization", *ACM Transactions on Database Systems*, Sep. 1981, 6(3), 513-537.

Heinz, S. et al., "Burst Tries: A Fast, Efficient Data Structure for String Keys", *ACm Transactions on Information Systems*, Apr. 2002, 20(2), 192-223.

Krishnan, P. et al., "Estimating Alphanumeric Selectivity in the Presence of Wildcards", *SIGMOD*, Jun. 1996, 282-293.

Maly, K., "Artificial Intelligence and Language Processing-Compressed Tries", *Communications of the ACM*, Jul. 1976, 19(7), 409-415.

\* cited by examiner

SYSTEM AND METHOD FOR USING A COMPRESSED TRIE TO ESTIMATE LIKE PREDICATES

This is a continuation of application Ser. No. 10/317,640, filed Dec. 12, 2002, now U.S. Pat. No. 6,829,602.

BACKGROUND OF THE INVENTION

1. Field of the Invention

The present invention is directed to the field of database management, and, more specifically, to using a compressed data structure to estimate the amount of data processed by a query.

2. Description of the Prior Art

Prior to executing a query, a database management system (DBMS) may determine a "plan" for executing the query in the most efficient manner. To determine the plan, the DBMS estimates the amount of data that will be processed by a query at each stage of the execution. To make such estimation, the DBMS may use a data structure referred to as a "trie." The trie is a model of a set of strings stored in a collection of data such as, for example, a relational data table. The trie enables the DBMS to quickly determine the number of strings in the collection of data that match a like predicate in a query.

An exemplary conventional trie is shown in FIG. 1. The exemplary trie of FIG. 1 includes the following strings: apple, apply, applying, seated, and seating. As shown, the top node 110 in trie 100, which may be referred to as the "root" node, is empty. The remaining bottom nodes each include a single character. A square node identifies the last letter in each string. Tracing a path from the root node to a corresponding square node and concatenating the characters stored in the rightmost nodes at each level of the path forms each string.

A conventional trie such as trie 100 of FIG. 1 has several drawbacks. Because each node in the trie includes only a single character, the trie may include a large number of nodes that occupy a large amount of memory. Furthermore, character-by-character matching may require a lot of time to perform, thereby delaying query execution. Another drawback is that repetitive suffixes such as "ing", which is a suffix in both "applying" and "seating", are identified in the trie multiple times. Such suffix repetition increases the amount of memory required to store the trie and increases the time required to perform matching. Thus, there is a need in the art for a "compressed" trie, in which multiple characters may be stored in a single node. Furthermore, it is desired that repetitive suffixes be identified and eliminated from such a compressed trie.

SUMMARY OF THE INVENTION

Accordingly, systems and methods for using a compressed trie to estimate like predicates are described. A compressed trie in accordance with the present invention has nodes including multiple character sub-strings. Such multiple character storage reduces the number of nodes in the trie, thereby reducing the amount of memory required for storing the trie and reducing the amount of time required to perform matching. Furthermore, in such a compressed trie, sub-strings are stored in a single character string. Each node references its corresponding sub-string by the sub-string's starting position and length in the character string. Multiple nodes may reference a single sub-string. Thus, referencing rather than storing sub-strings in corresponding nodes eliminates repetitive sub-string storage, thereby reducing the amount of memory required for storing the trie.

An exemplary embodiment of the present invention enables a string to be inserted into the trie. The string is assigned to one or more nodes in the trie by dividing the string into one or more sub-strings and assigning each sub-string to a corresponding node. Each sub-string is then added to a character string, in which each sub-string is preferably identified by a starting position and a length. The starting position and length of each sub-string is then stored at its corresponding node.

Another exemplary embodiment of the present invention enables the trie to be used to estimate the number of rows in a data table that match a like predicate. Beginning at a root node, the nodes in the trie are examined to determine if they match the like predicate. After examination, the counts of occurrences at each matching node are accumulated to determine a non-scaled estimate. The non-scaled estimate is then scaled based on the representative portion of the table that is included in the trie.

BRIEF DESCRIPTION OF THE DRAWINGS

The illustrative embodiments will be better understood after reading the following detailed description with reference to the appended drawings, in which.

DETAILED DESCRIPTION

Figure 1:
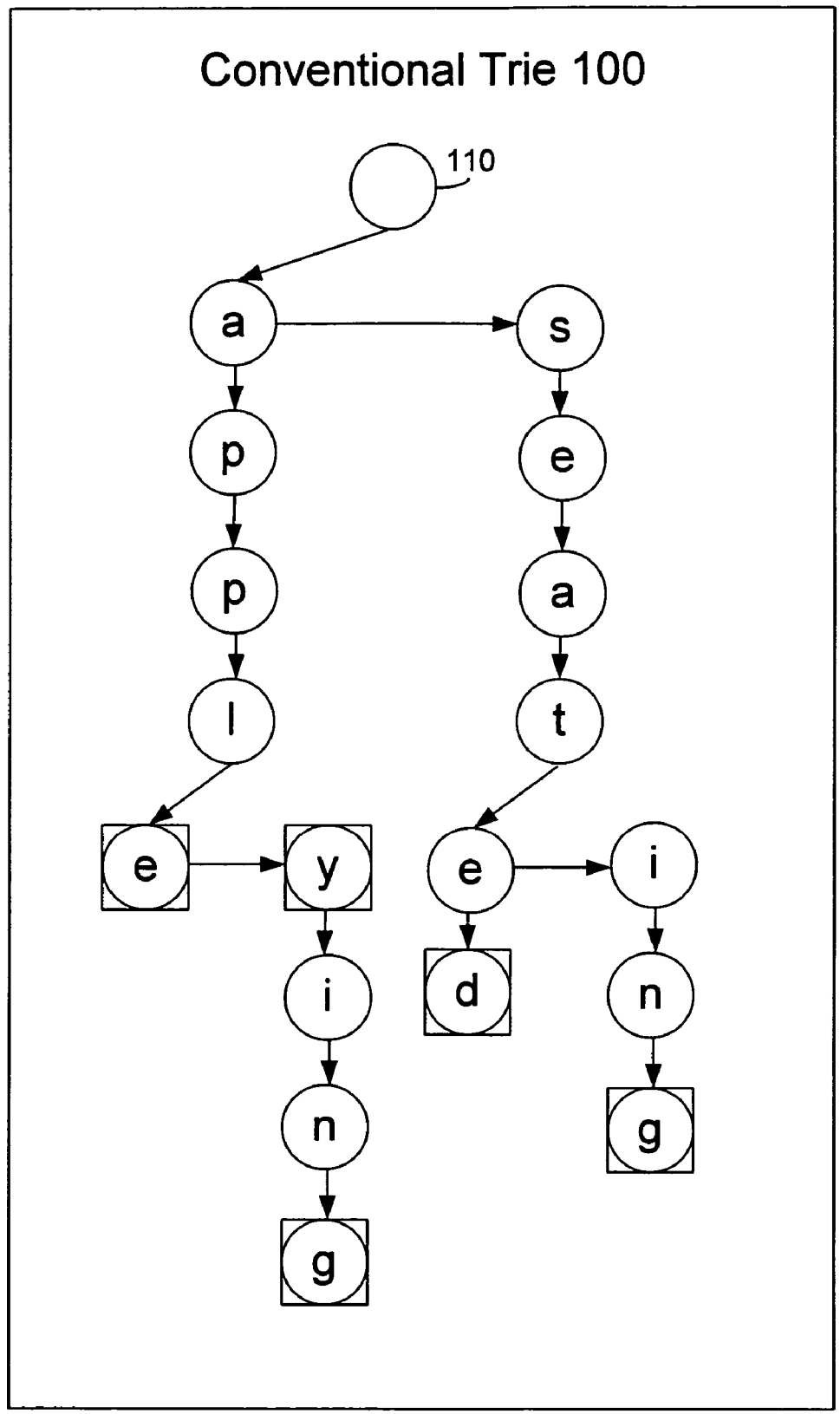
FIG. 1 is an exemplary conventional trie.

Systems and methods that meet the above-mentioned objects and provides other beneficial features in accordance with the presently preferred exemplary embodiment of the invention will be described below with reference to the aforementioned figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

Figure 2:
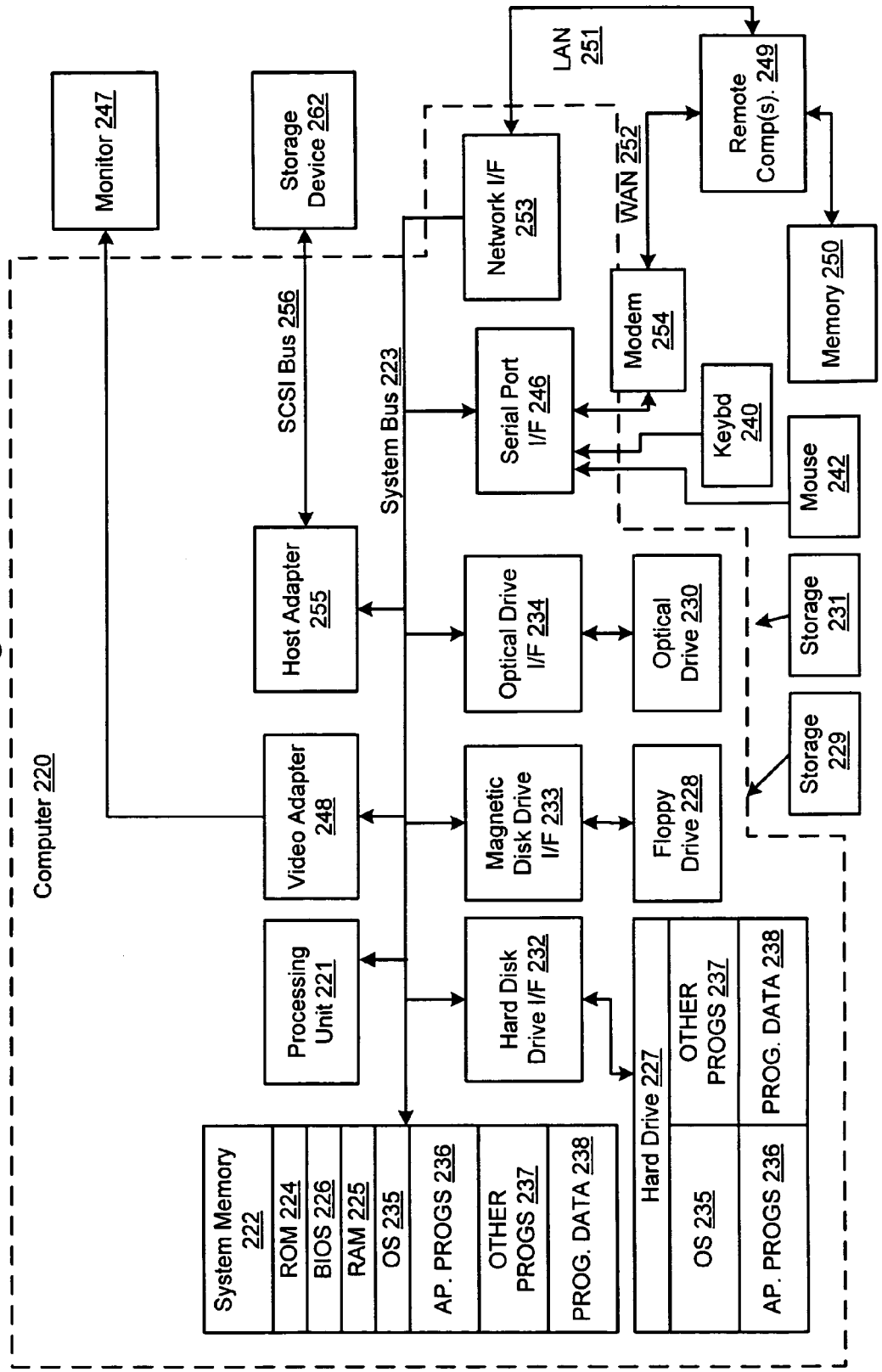
FIG. 2 is a block diagram representing a general purpose computer system in which aspects of the present invention and/or portions thereof may be incorporated.

FIG. 2 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 220 or the like, including a processing unit 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures. The system memory includes read-only memory (ROM) 224 and random access memory (RAM) 225. A basic input/output system 226 (BIOS), containing the basic routines that help to transfer information between elements within the personal computer 220, such as during start-up, is stored in ROM 224.

The personal computer 220 may further include a hard disk drive 227 for reading from and writing to a hard disk (not shown), a magnetic disk drive 228 for reading from or writing to a removable magnetic disk 229, and an optical disk drive 230 for reading from or writing to a removable optical disk 231 such as a CD-ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide non-volatile storage of computer readable instructions, data structures, program modules and other data for the personal computer 220.

Although the exemplary environment described herein employs a hard disk, a removable magnetic disk 229, and a removable optical disk 231, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 229, optical disk 231, ROM 224 or RAM 225, including an operating system 235, one or more application programs 236, other program modules 237 and program data 238. A user may enter commands and information into the personal computer 220 through input devices such as a keyboard 240 and pointing device 242 such as a mouse. Other input devices (not shown) may include a microphone, joystick, game pad, satellite disk, scanner, or the like. These and other input devices are often connected to the processing unit 221 through a serial port interface 246 that is coupled to the system bus, but may be connected by other interfaces, such as a parallel port, game port, or universal serial bus (USB). A monitor 247 or other type of display device is also connected to the system bus 223 via an interface, such as a video adapter 248. In addition to the monitor 247, a personal computer typically includes other peripheral output devices (not shown), such as speakers and printers. The exemplary system of FIG. 2 also includes a host adapter 255, a Small Computer System Interface (SCSI) bus 256, and an external storage device 262 connected to the SCSI bus 256.

The personal computer 220 may operate in a networked environment using logical connections to one or more remote computers, such as a remote computer 249. The remote computer 249 may be another personal computer, a server, a router, a network PC, a peer device or other common network node, and typically includes many or all of the elements described above relative to the personal computer 220, although only a memory storage device 250 has been illustrated in FIG. 2. The logical connections depicted in FIG. 2 include a local area network (LAN) 251 and a wide area network (WAN) 252. Such networking environments are commonplace in offices, enterprise-wide computer networks, intranets, and the Internet.

When used in a LAN networking environment, the personal computer 220 is connected to the LAN 251 through a network interface or adapter 253. When used in a WAN networking environment, the personal computer 220 typically includes a modem 254 or other means for establishing communications over the wide area network 252, such as the Internet. The modem 254, which may be internal or external, is connected to the system bus 223 via the serial port interface 246. In a networked environment, program modules depicted relative to the personal computer 220, or portions thereof, may be stored in the remote memory storage device. It will be appreciated that the network connections shown are exemplary and other means of establishing a communications link between the computers may be used.

Exemplary System and Method of the Present Invention

Generally, unlike a conventional trie that has nodes including only a single character, a compressed trie in accordance with the present invention has nodes including multiple character sub-strings. Such multiple character storage reduces the number of nodes in the trie, thereby reducing the amount of memory required for storing the trie and reducing the amount of time required to perform matching. Furthermore, in such a compressed trie, sub-strings are stored in a single character string. Each node references its corresponding sub-string by the sub-string's starting position and length in the character string. Multiple nodes may reference a single sub-string. Thus, referencing rather than storing sub-strings in corresponding nodes eliminates repetitive sub-string storage, thereby reducing the amount of memory required for storing the trie.

Figure 3:
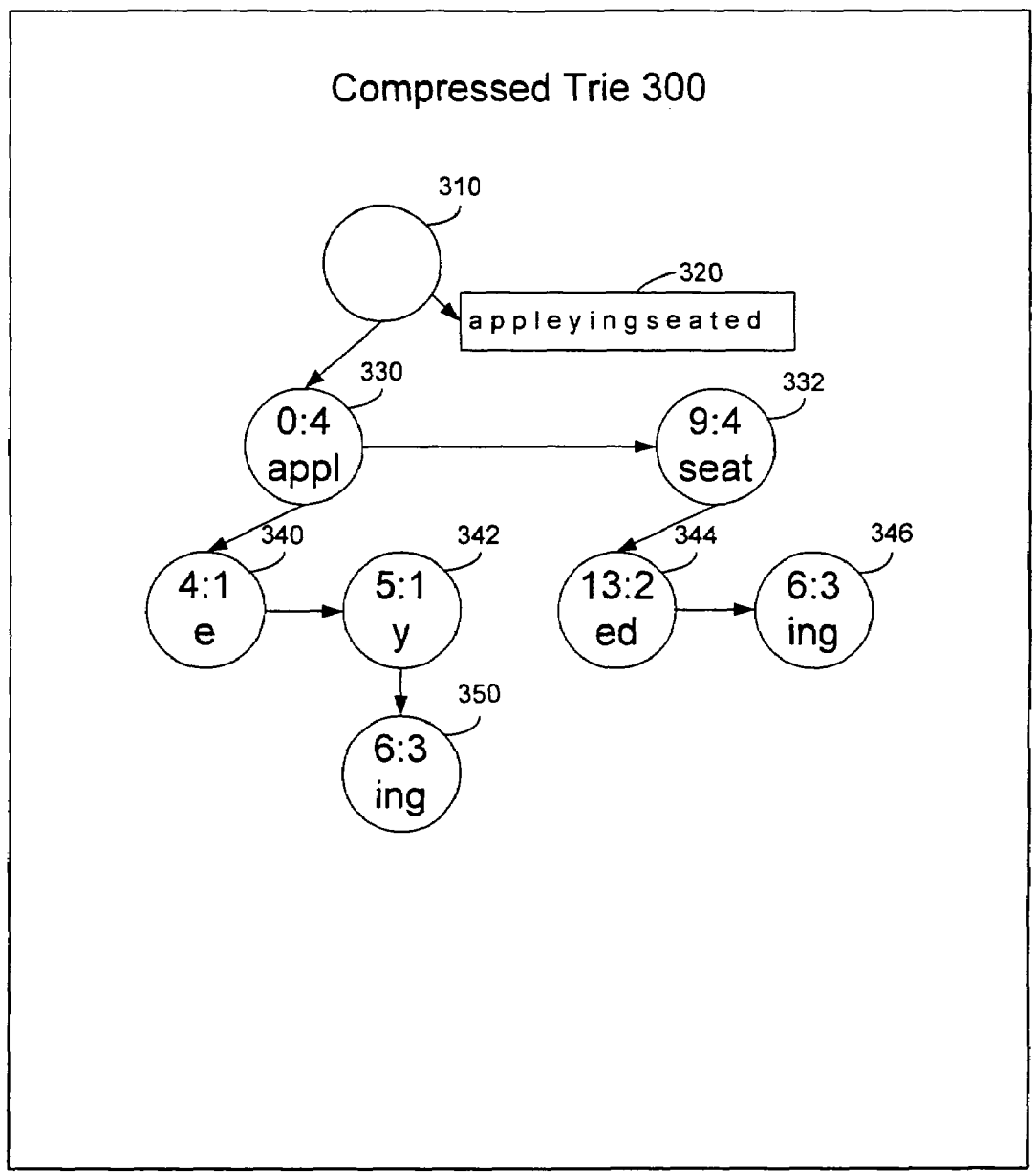
FIG. 3 is an exemplary compressed trie in accordance with the present invention.

An exemplary compressed trie in accordance with the present invention is shown in FIG. 3. Compressed trie 300 includes the following strings: apple, apply, applying, seated, seating. As shown, the top node 310 in trie 300, which may be referred to as the "root" node, is empty. The remaining bottom nodes 330-350 each include a sub-string. Tracing a path from root node 310 to a corresponding bottom node 330-350 and concatenating the sub-strings stored in the rightmost nodes at each level of the path forms each string. Trie 300 also includes a character buffer 320. Character buffer 320 includes a character string that is composed of all the sub-strings in bottom nodes 330-350. A sub-string that appears in multiple nodes appears only once in the character buffer. For example, the sub-string "ing", which appears in nodes 346 and 350, appears in character buffer 320 only once.

Each bottom node 330-350 in trie 300 stores two numbers in the form X:Y that may be referred to as an "index". The index is used to reference a node's corresponding sub-string in character buffer 310. The first number X in the index indicates the starting position of a node's corresponding sub-string. For example, the starting position of the sub-string "seat" in character buffer 310 is position "9." Thus, the starting position "9" is identified by the first number X in the index at node 332. The second number in the index indicates the length of a node's corresponding sub-string. For example, the length of sub-string "seat" is four characters. Thus, the length "4" is identified by the second number Y in the index at node 332.

An embodiment of the invention, described below with reference to FIGS. 4-6, enables strings to be inserted into trie 300.

Another embodiment of the invention, described below with reference to FIG. 7, enables trie 300 to be used to estimate the number of rows in a table that match a like predicate in a query.

Inserting a String into the Compressed Trie

Figure 4:
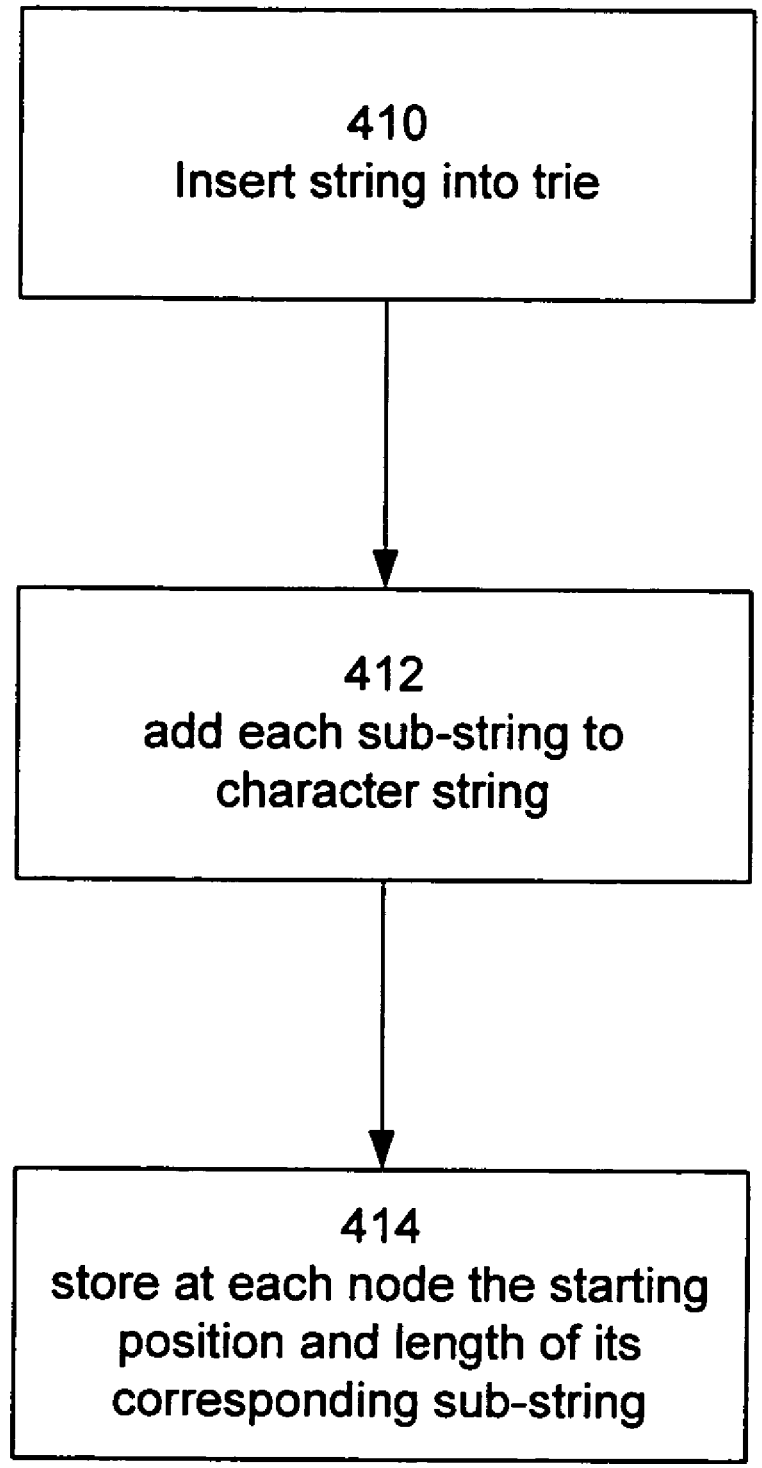
FIG. 4 is a flowchart of an exemplary method for inserting a string into a compressed trie in accordance with the present invention.

A flowchart of an exemplary method for inserting a string into a compressed trie in accordance with the present invention is shown in FIG. 4. Generally, the string is assigned to one or more nodes in trie 300 by dividing the string into one or more sub-strings and assigning each sub-string to a corresponding node. Each sub-string is then added to character string 320 in which the sub-string is preferably identified by a starting position and a length. The starting position and length of each sub-string is then stored at its corresponding node.

As shown, at step 410, a string is assigned to one or more nodes in trie 300. An exemplary embodiment of step 410 is described in detail below with reference to FIGS. 5A and 5B. Generally, a string is divided into one or more sub-strings, and each sub-string is assigned to a corresponding node in trie 300.

At step 412, each sub-string is added to the character string. An exemplary embodiment of step 412 is described in detail below with reference to FIG. 6. Each sub-string added to the character string at step 412 is preferably identified by a starting position and a length. At step 414, the starting position and length of the assigned sub-string is stored at each corresponding node.

Figure 5A:
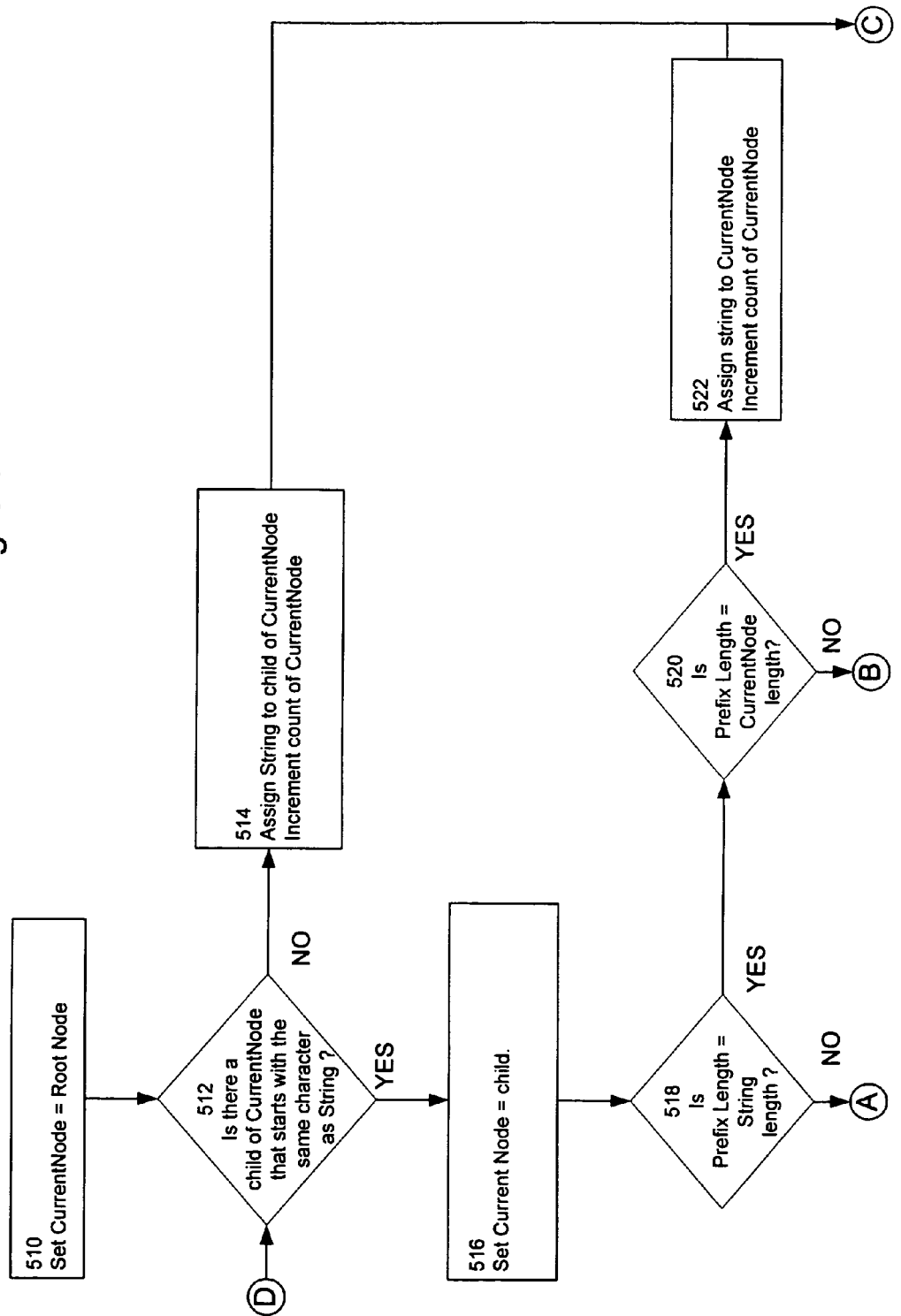
FIGS. 5A and 5B are a flowchart of an exemplary method for assigning a string to one or more nodes in a compressed trie in accordance with the present invention.
Figure 5B:
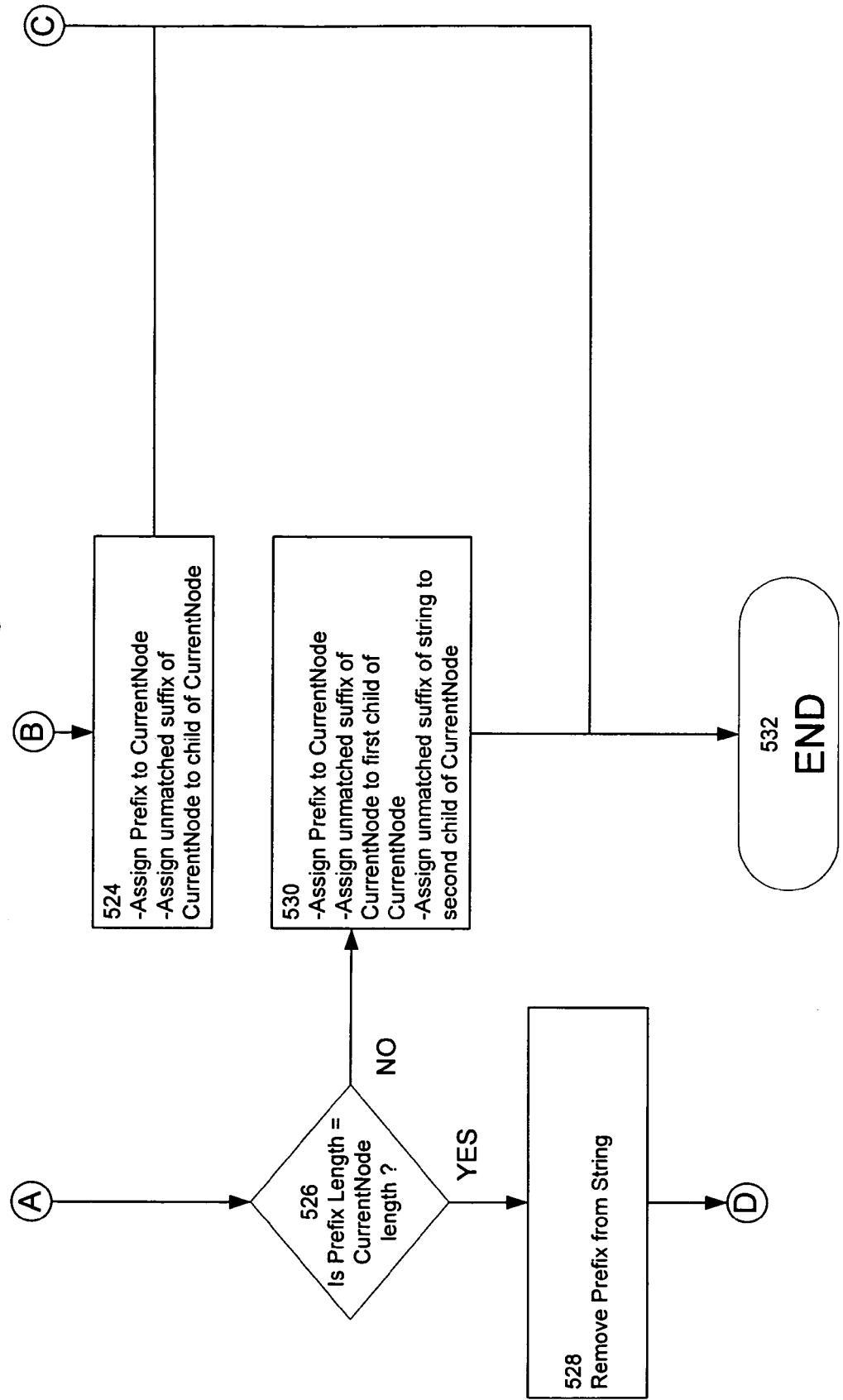

A flowchart of an exemplary method for assigning a string to one or more nodes in a compressed trie in accordance with the present invention is shown in FIGS. 5A and 5B. Generally, a string is divided into at least one sub-string, and each sub-string is assigned to a corresponding node in trie 300. A sub-string may include the entire string, a matched prefix of the string, or an unmatched suffix of the string.

As shown in FIG. 5A, at step 510, "CurrentNode" is assigned to be root node 310.

At step 512, it is determined if there is an existing child of CurrentNode that starts with the same character as the string. A child is a node that is located a level below its parent and is connected to its parent. For example, nodes 340 and 342 are children of node 330.

If, at step 512, it is determined that there is not an existing child of CurrentNode that starts with the same character as the string, then, at step 514, the string is assigned to a new child of CurrentNode that is inserted into trie 300 below CurrentNode, and, at step 532, the exemplary method is completed.

If, at step 512, it is determined that there is an existing child of CurrentNode that starts with the same character as the string, then, at step 516, CurrentNode is assigned to be the existing child. At step 518, it is determined if the length of a matched prefix of the string and CurrentNode is equal to the length of the string. For example, if the string is "application" and CurrentNode is node 330 with sub-string "appl", then the matched prefix is "appl", and the length of the matched prefix is not equal to the length of the string.

If, at step 518, it is determined that the length of the matched prefix is equal to the length of the string, then, at step 520, it is determined if the length of the matched prefix is equal to the length of CurrentNode.

If, at step 520, it is determined that the length of the matched prefix is equal to the length of CurrentNode, then, at step 522, the string is assigned to CurrentNode, and a count of occurrences at CurrentNode is increased. At step 532, the exemplary method is completed.

If, at step 520, it is determined that the length of the matched prefix is not equal to the length of CurrentNode, then, at step 524, the unmatched suffix of CurrentNode is removed and assigned to a new child of CurrentNode that is inserted in trie 300. For example, if the string is "sea" and CurrentNode is node 332 with string "seat", then CurrentNode 332 will be shortened from "seat" to the matched prefix "sea", and the unmatched suffix "t" will be assigned to a new child of CurrentNode 332. The new child will be a parent of nodes 344 and 346.

If, at step 518, it is determined that the length of the matched prefix is not equal to the length of the string, then, at step 526, it is determined if the length of the matched prefix is equal to the length of CurrentNode.

If, at step 526, it is determined that the length of the matched prefix is equal to the length of CurrentNode, then, at step 528, the matched prefix is removed from the string, and the exemplary method returns to step 512. For example, if the string is "application" and CurrentNode is node 330 with sub-string "appl", then the string is shortened to "ication."

If, at step 526, it is determined that the length of the matched prefix is not equal to the length of CurrentNode, then, at step 530, the unmatched suffix of CurrentNode is removed and assigned to a first new child of CurrentNode that is inserted in trie 300, and the unmatched suffix of the string is assigned to a second new child of CurrentNode that is inserted in trie 300. For example, if the string is "season" and CurrentNode is node 332 with string "seat", then CurrentNode 332 will be shortened from "seat" to the matched prefix "sea." The unmatched suffix "t" of CurrentNode 332 will be assigned to a first new child of CurrentNode 332. The unmatched suffix "son" of the string will be assigned to a second new child of CurrentNode 332. The first new child will be a parent of nodes 344 and 346. The second new child will not be a parent of nodes 344 and 346.

Thus, in the exemplary method described above with reference to FIGS. 5A and 5B, a string is assigned to one or more nodes in compressed trie 300. A string is divided into at least one sub-string, and each sub-string is assigned to a corresponding node. A sub-string may include the entire string, a matched prefix of the string, or an unmatched suffix of the string. An existing node may also be divided into a matched prefix and an unmatched suffix, and the unmatched suffix may be removed from the existing node and inserted into a new child node.

Figure 6:
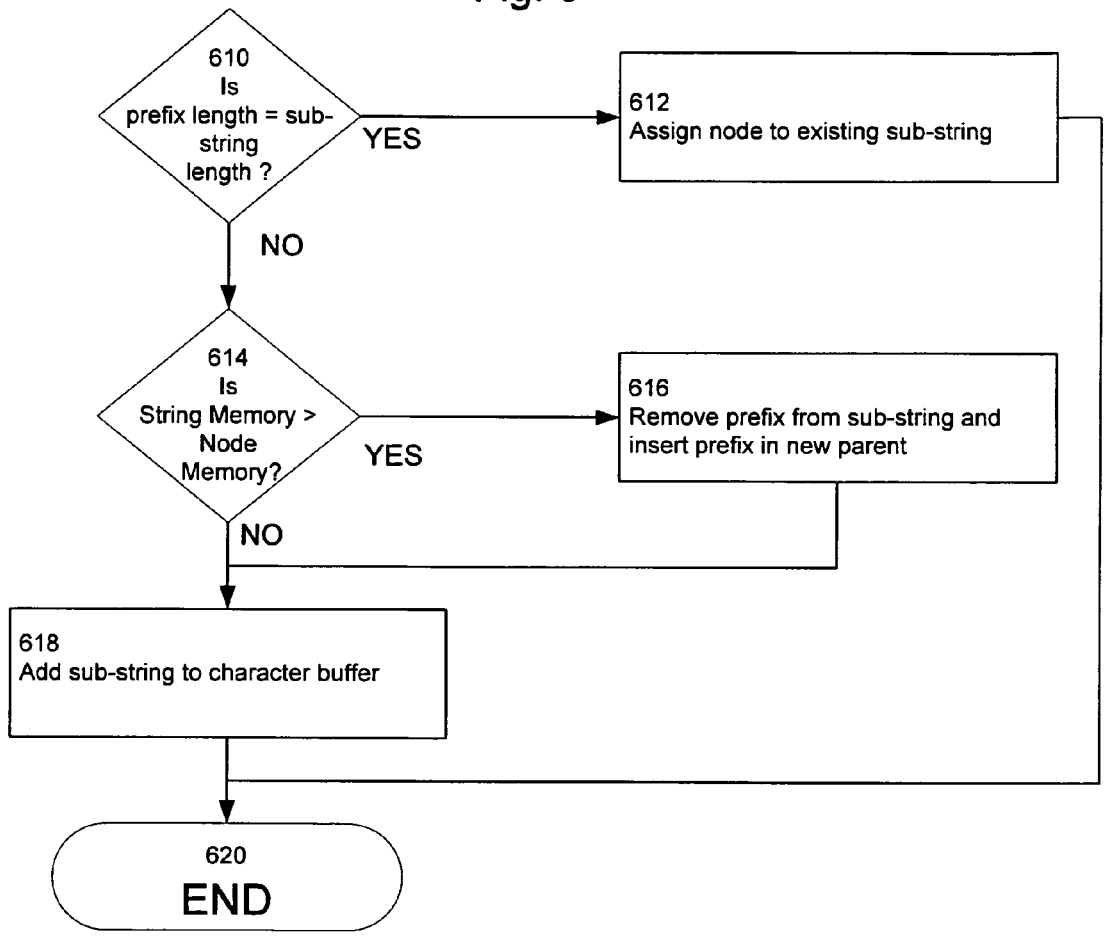
FIG. 6 is a flowchart of an exemplary method for adding a sub-string to a character string in accordance with the present invention.

A flowchart of an exemplary method for adding a sub-string to the character string in accordance with the present invention is shown in FIG. 6. At step 610, it is determined if the length of the longest prefix of the sub-string already existing in character string 320 is equal to the length of the sub-string. For example, if the sub-string is "ing" and the character string is "appleying", then the longest prefix is "ing", and the length of the longest prefix is three, which is equal to the length of the sub-string. If the sub-string is "ication" and the character string is "appleying", then the longest prefix is "i", and the length of the longest prefix is one, which is not equal to the length of the sub-string. If the sub-string is "seat" and the character string is "appleying", then there is no longest prefix, and the length of the longest prefix is zero, which is not equal to the length of the sub-string.

If, at step 610, it is determined that the length of the longest prefix is equal to the length of the sub-string, then, at step 612, the corresponding node is assigned to the existing sub-string in character string 320, and, at step 620, the exemplary method is completed.

If, at step 610, it is determined that the length of the longest prefix is not equal to the length of the sub-string, then, at step 614, it is determined if the memory required to store the sub-string at character buffer 320 is greater than the memory required to add a node to trie 300.

If, at step 614, it is determined that the memory required to store the sub-string at character buffer 320 is not greater than the memory required to add a node to trie 300, then, at step 618, the sub-string is added to character string 320, and, at step 620, the exemplary method is completed.

If, at step 614, it is determined that the memory required to store the sub-string at character buffer 320 is greater than the memory required to add a node to trie 300, then, at step 616 the longest prefix is removed from the sub-string and assigned to a new parent of the corresponding node. The method then returns to step 618.

Thus, in the exemplary methods described above with reference to FIGS. 4-6, a string is inserted into trie 300. The string is assigned to one or more nodes in trie 300 by dividing the string into one or more sub-strings and assigning each sub-string to a corresponding node. Each sub-string is added to character string 320, in which each sub-string is preferably identified by a starting position and a length. The starting position and length of each sub-string is stored at its corresponding node.

The methods set forth above with reference to FIGS. 4-6 are preferably repeated for each string in a representative set of strings. The set of strings is preferably representative of a collection of data, such as, for example, a data table to which trie 300 corresponds. Once each representative string has been inserted in trie 300, trie 300 may be used to estimate a portion of data in the corresponding data collection that matches a like predicate in a query. For example, trie 300 may be used to estimate a number of rows in a corresponding data table that match a given like predicate. An embodiment of the invention, described below with reference to FIG. 7, enables trie 300 to be used to make such an estimation.

Figure 7:
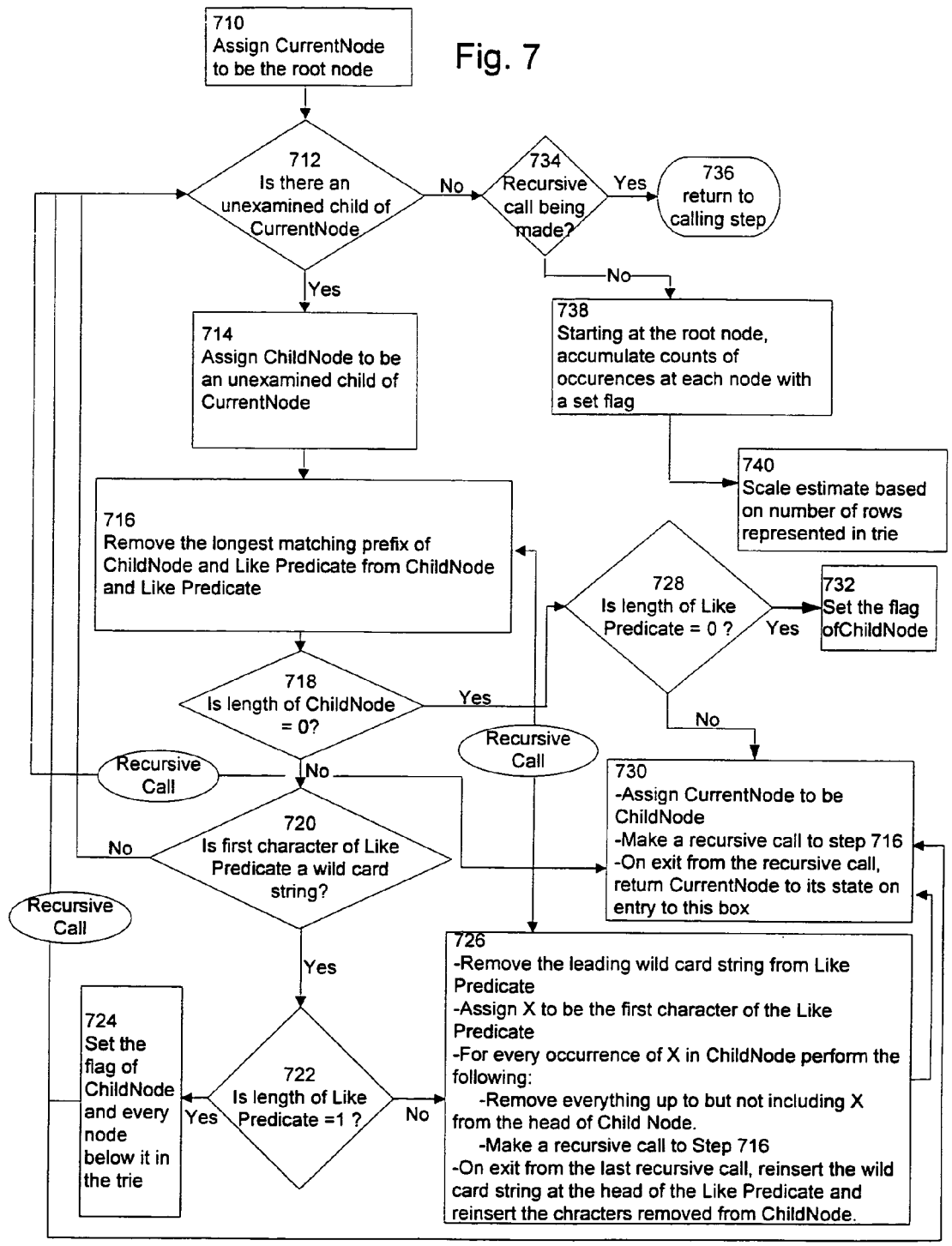
FIG. 7 is a flowchart of an exemplary method for using a compressed trie to estimate the number of rows that satisfy a given like predicate in a data table in accordance with the present invention.

Using the Compressed Trie to Estimate the Number of Rows that Satisfy a Given Like Predicate in a Table An exemplary method for using a compressed trie to estimate the number of rows that satisfy a given like predicate in a table in accordance with the present invention is shown in FIG. 7. Generally, beginning at root node 310, the nodes in trie 300 are examined to determine if they match the like predicate. After examination, the counts of occurrences at each matching node are accumulated to determine a non-scaled estimate. The non-scaled estimate is then scaled based on the representative portion of the table that is included in trie 300.

As shown, at step 710, "CurrentNode" is assigned to be root node 310. At step 712, it is determined if there is a child of CurrentNode that has not yet been examined.

If, at step 712, it is determined if there is a child of CurrentNode that has not yet been examined, then, at step 714, "ChildNode" is assigned to be an unexamined child of CurrentNode.

At step 716, a longest matching prefix of the like predicate and ChildNode is determined and removed from both the like predicate and ChildNode.

A "wild card string character" may appear in the like predicate. The wild card string character, as that term is used herein, refers to a character that represents any string of zero or more characters. The wild card string character is preferably represented by a "%" notation. However, as should be appreciated, any notation may be used to represent the wild card string character. For purposes of determining the longest matching prefix at step 716, the wild card string character is considered to not match any single character.

A "wild card single character" may also appear in the predicate. The wild card single character, as that term is used herein, refers to a character that represents any single character. The wild card single character is preferably represented by a "_" notation. However, as should be appreciated, any notation may be used to represent the wild card string character. For purposes of determining the longest matching prefix at step 716, the wild card single character is considered to match any single character.

At step 718, it is determined if there is a remaining unmatched suffix in ChildNode.

If, at step 718, it is determined that there is no remaining unmatched suffix in ChildNode, then, at step 720, it is determined if the first character in the remaining like predicate is a wild card string character.

If, at step 720, it is determined that the first character in the remaining like predicate is a wild card string character, then, at step 722, it is determined if the remaining like predicate has a length of one character.

If, at step 722, it is determined that the remaining like predicate has a length of one character, then, at step 724, the flags of ChildNode and every node below it in trie 300 are set, and a recursive call to step 712 is made.

If, at step 722, it is determined that the remaining like predicate does not have a length of one character, then, at step 726, the leading wild card string character is removed from the like predicate. A variable, "X", is assigned to be the first remaining character in the like predicate, which may be referred to as the "following character." For each occurrence of X in ChildNode, every character preceding the current X is removed and a recursive call is made to step 716. On exit from the last recursive call, the leading wild card string character is reinserted in the like predicate and the characters removed from ChildNode are also reinserted. The method then advances to step 730.

If, at step 718, it is determined that there is a remaining unmatched suffix in ChildNode, then, at step 728, it is determined if there is a remaining suffix of the like predicate.

If, at step 728, it is determined that there is a remaining suffix of the like predicate, then, at step 730, CurrentNode is assigned to be ChildNode, and a recursive call is made to step 712. On exit from the recursive call CurrentNode is reassigned to the previously assigned CurrentNode, and the method returns to step 712.

If, at step 728, it is determined that there is not a remaining suffix of the like predicate, then, at step 732, the flag of ChildNode is set, and the method returns to step 712.

If, at step 712, it is determined that there is no child of CurrentNode that has not yet been examined, then, at step 734, it is determined if a recursive call is being made.

If, at step 734, it is determined that a recursive call is being made, then, at step 736, the method returns to the calling step.

If, at step 734, it is determined that a recursive call is not being made, then, at step 738, starting at root node 310, the count of occurrences at each node with a set flag are accumulated to determine a non-scaled estimate. The count of occurrences is set and incremented during the insertion of a string into trie 300 discussed above with reference to steps 514 and 522 of FIG. 5A. At step 740, the non-scaled estimate is scaled based on the representative portion of the table that is included in trie 300. For example, if twenty five percent of the rows of the table are inserted into trie 300, then the scaled estimate is four times the non-scaled estimate.

Thus, in the exemplary method discussed above with reference to FIG. 7, compressed trie 300 is used to estimate the number of rows in a table. Beginning at root node 310, the nodes in trie 300 are examined to determine if they match the like predicate. After examination, the counts of occurrences at each matching node are accumulated to determine a non-scaled estimate. The non-scaled estimate is then scaled based on the representative portion of the table that is included in trie 300.

Thus, systems and methods for using a compressed trie to estimate like predicates have been disclosed. A compressed trie in accordance with the present invention has nodes including multiple character sub-strings. Such multiple character storage reduces the number of nodes in the trie, thereby reducing the amount of memory required for storing the trie and reducing the amount of time required to perform matching. Furthermore, in such a compressed trie, multiple nodes may reference a single sub-string, thereby eliminating repetitive sub-string storage. The compressed trie may be used to estimate like predicates by examining nodes in the trie and setting a flag is set at each node that matches the like predicate.

While the present invention has been described in connection with the preferred embodiments of the various figures, it is to be understood that other similar embodiments may be used or modifications and additions may be made to the described embodiment for performing the same function of the present invention without deviating therefrom. For example, while the present invention is described in terms of using a compressed trie to store strings corresponding to rows in a data table, a compressed trie in accordance with the present invention may be used to store all or at least a portion of strings corresponding to any collection of data. Therefore, the present invention should not be limited to any single embodiment, but rather should be construed in breadth and scope in accordance with the appended claims.

We claim:

1. A method of using a compressed trie to estimate a number of rows in a data table that match a like predicate, the method comprising:
   for each child node of a root node of the trie, examining the child by:
      removing a longest matching prefix of the like predicate and the child from the like predicate and the child;
      determining if the remaining child has a length of zero;
         matching based on the like predicate when the remaining child has length of zero; and
         matching based on the like predicate and the child when the remaining child does not have a length of zero; and
   transforming a value representing the estimated number of rows in the data table that match the like predicate in accordance with matching of the compressed trie to the like predicate, the transforming enabling the number of rows in the data table that match the like predicate to be estimated,
   the method being executed on a computer comprising a processor and a memory.

2. The method of claim 1, further comprising:
   assigning a current node to be a root node of the trie;
      determining if there is a child of the current node that has not yet been examined;
      setting the child to be the current child when there is a child of the current node that has not yet been examined; and
      when there is no child of the current node that has not yet been examined:
   determining if a recursive call is being made;
      exiting from the recursive call when a recursive call is being made; and accumulating a count of occurrences at each node with a set flag when a recursive call is not made.

3. The method of claim 2, further comprising, when the current child is a descendant of a child of the root node of the trie, examining the current child in the same manner as each child of the root node of the trie is examined.

4. The method of claim 3, wherein the step of matching based on the like predicate comprises:
   determining if the like predicate has a length of zero;
   when the like predicate has a length of zero:
      setting a flag at the current child; and
      returning to the step of determining if there is a child of the current node that has not yet been examined; and
   examining the children of the current child when the like predicate does not have a length of zero.

5. The method of claim 4, wherein examining the children of the current child comprises:
   assigning the current node to be the current child; and
   making a recursive call to the step of determining when there is a child of the current node that has not yet been examined.

6. The method of claim 3, wherein matching based on the like predicate and the current child comprises:
   determining if a first character in the remaining like predicate is a wild card string character;
   matching the wild card string character with the current child when a first character in the remaining like predicate is a wild card string character; and
   returning to the step of determining if there is a child of the current node that has not yet been examined when a first character in the remaining like predicate is not a wild card string character.

7. The method of claim 6, wherein matching the wild card string character with the current child comprises:
   determining if the like predicate has a length of one character;
   when the like predicate has a length of one character;
      setting a flag at the current child and at every node below the current child; and
      making a recursive call to the step of determining if there is a child of the current node that has not yet been examined; and
   matching a following character with the current child when the like predicate does not have a length of one character.

8. The method of claim 7, wherein matching a following character with the current child comprises:
   removing the wild card string character from the like predicate;
   assigning the following character to be a first character in the like predicate; and
   for each occurrence of the following character in the current child:
      removing all characters preceding the following character from the current child; and making a recursive call to the step of removing a longest matching prefix of the like predicate and the current child from the like predicate and the current child.

9. The method of claim 2, further comprising multiplying the accumulated count by a portion of rows in the data table represented by the trie.

10. A method of matching a node in a compressed trie to a like predicate with a first character that is a wild card string character, the method comprising:
  determining if the like predicate has a length of one character;
    matching the wild card character with the node when the like predicate has a length of one character
    when the like predicate does not have a length f one character:
      removing the wild card string character from the like predicate;
      assigning the following character to be a first character in the like predicate; and
      for each occurrence of the following character in the node:
        removing all characters preceding the following character from the node;
        removing a longest matching prefix of the like predicate and the node from the like predicate and the node; and
        matching based on the remainder of the like predicate and the node; and
  transforming a value representing an estimated portion of a data store that matches the like predicate in accordance with matching of the compressed trie to the like predicate, the transforming enabling the portion of the data store that matches the like predicate to be estimated,
  the method being executed on a computer comprising processor and a memory.

11. A system for using a compressed trie to estimate a number of rows in a data table that matches a like predicate, the system comprising:
  a processor operative to execute computer executable instructions; and
  a computer memory having stored therein computer executable instructions for examining each child node of a root node of the trie by:
    removing a longest matching prefix of the like predicate and the child from the like predicate and the child;
    determining if the remaining child has a length of zero;
      matching based on the like predicate when the remaining child has a length of zero; and
      matching based on the like predicate and the child when the remaining child does not have a length of zero: and
    transforming a value representing the estimated number of rows in the data table that match the like predicate in accordance with matching of the compressed trie to the like predicate, the transforming enabling the number of rows in the data table that match the like predicate to be estimated.

12. The system of claim 11, further comprising computer executable instructions for:
  assigning a current node to be a root node of the trie;
  determining if there is a child of the current node that has not yet been examined;
    setting the child to be the current child when there is a child of the current node that has not yet been examined; and
    when there is no child of the current node that has not yet been examined:
      determining if a recursive call is being made;
      exiting from the recursive call when a recursive call is being made; and
      accumulating a count of occurrences at each node with a set flag when a recursive call is not made.

13. The system of claim 12, further comprising computer executable instructions for, when the current child is a descendant of a child of the root node of the trie, examining the current child in the same manner as each child of the root node of the trie is examined.

14. The system of claim 13, wherein the step of matching based on the like predicate comprises:
  determining if the like predicate has a length of zero;
  when the like predicate has a length of zero:
    setting a flag at the current child; and
    returning to the step of determining if there is a child of the current node that has not yet been examined; and
  examining the children of the current child when the like predicate does not have a length of zero.

15. The system of claim 14, wherein examining the children of the current child comprises:
  assigning the current node to be the current child; and
  making a recursive call to the step of determining when there is a child of the current node that has not yet been examined.

16. The system of claim 13, wherein matching based on the like predicate and the current child comprises:
  determining if a first character in the remaining like predicate is a wild card string character;
  matching the wild card string character with the current child when a first character in the remaining like predicate is a wild card string character; and
  returning to the step of determining if there is a child of the current node that has not yet been examined when a first character in the remaining like predicate is not a wild card string character.

17. The system of claim 16, wherein matching the wild card string character with the current child comprises:
  determining if the like predicate has a length of one character;
  when the like predicate has a length of one character:
    setting a flag at the current child and at every node below the current child; and
    making a recursive call to the step of determining if there is a child of the current node that has not yet been examined; and
  matching a following character with the current child when the like predicate does not have a length of one character.

18. The system of claim 17, wherein matching a following character with the current child comprises:
  removing the wild card string character from the like predicate; assigning the following character to be a first character in the like predicate; and
  for each occurrence of the following character in the current child:
    removing all characters preceding the following character from the current child; and
    making a recursive call to the step of removing a longest matching prefix of the like predicate and the current child from the like predicate and the current child.

19. The system of claim 12, further comprising computer executable instructions for multiplying the accumulated count by a portion of rows in the data table represented by the trie.

* * * * *